Oct. 3, 1961  W. R. LEISSNER  3,002,528
CHECK VALVE GUIDE AND STOP
Filed May 18, 1959
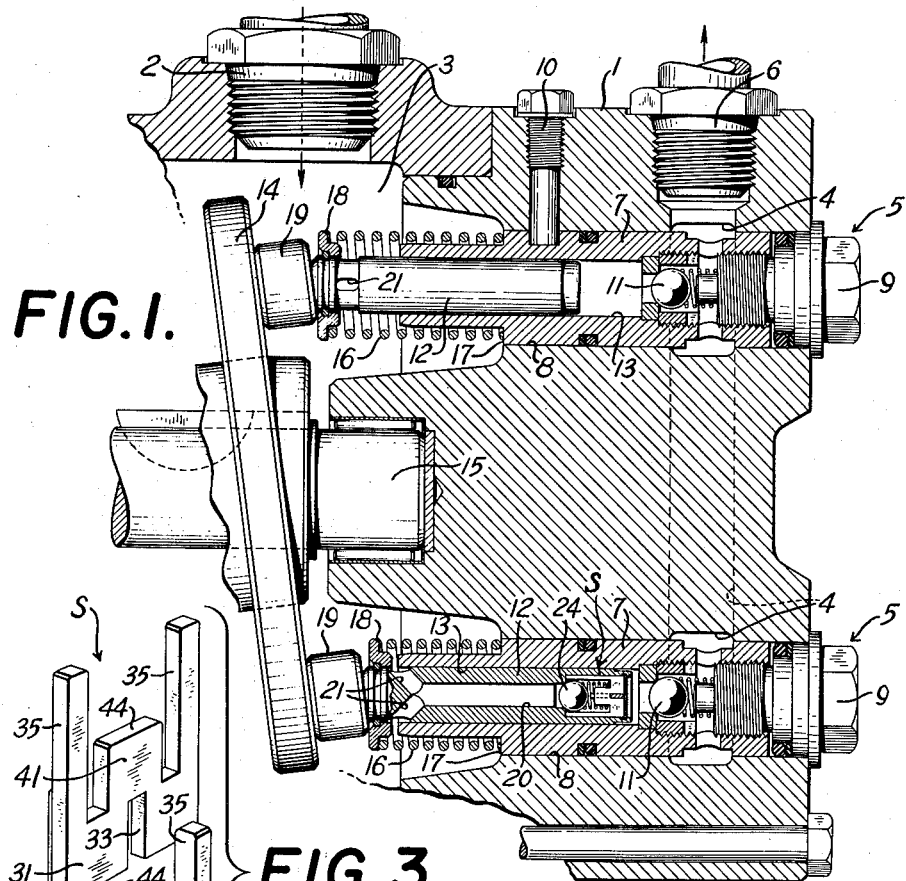
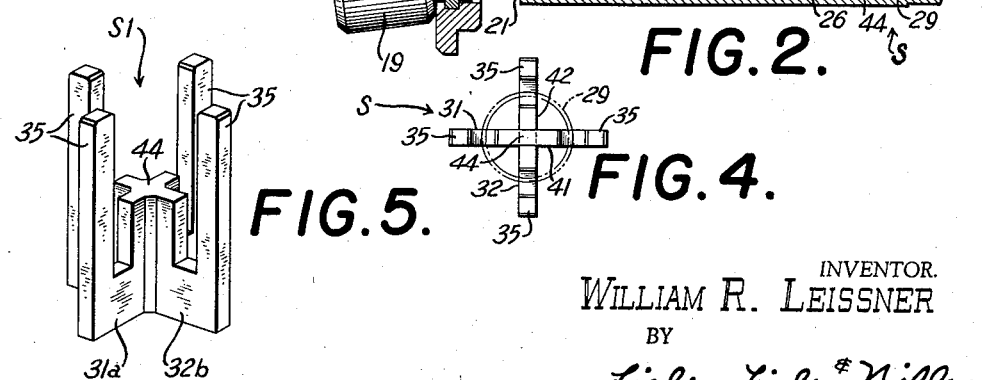
INVENTOR.
WILLIAM R. LEISSNER
BY
Lieber, Lieber & Nilles
Attorneys United States Patent Office 3,002,528
Patented Oct. 3, 1961

3,002,528
CHECK VALVE GUIDE AND STOP
William R. Leissner, Milwaukee, Wis., assignor to Dynex, Inc., Pewaukee, Wis., a corporation of Wisconsin
Filed May 18, 1959, Ser. No. 813,799
1 Claim. (Cl. 137—539)

The present invention relates generally to a valve spacer for a hydraulic check valve through which a turbulent-free flow of fluid must pass. The invention finds particular, though not exclusive utility, in a piston type hydraulic pump and, more specifically, for use, for example, with a piston of such a pump.

The subject matter of this invention is in the nature of an improvement over the valve spacer of my co-pending U.S. application Serial Number 685,441, filed September 23, 1957, and entitled "Hydraulic Pump," now U.S. Patent No. 2,945,444, issued July 19, 1960, and that spacer has proven highly satisfactory for its intended uses.

With the advent of larger capacity pumps and a consequent greater flow of fluid through the piston, the requirement of turbulent-free flow through the piston is imperative and to accomplish this it has been found necessary to precisely guide the movable valve element in its movement.

Stated otherwise, for completely smooth operation of the movable valve element, such as for example, a check ball or conical poppet, the element should be accurately guided in its opening or closing movement, that is, in a direction toward and away from its complementary valve seat. As the cyclic action and timing of ball check movement must be precisely related to the outlet check valve movement and also to the changing of direction of piston movement, for maximum pump efficiency, it is essential that the ball must operate smoothly and accurately with respect to its seating surface. In these larger pumps, it is necessary to prevent the movable valve element from "walking around" during its shifting movement, and to insure that it strikes its valve seat in an aligned manner, in order to prevent damage and deformation of the seat.

Accordingly, the present invention provides a valve spacer for a check valve, which spacer provides a definite stop for the valve element associated therewith, acts to smoothly and accurately guide the element in its movement, and furthermore and importantly, is of such a design so as to insure laminar or turbulent-free flow of fluid through the valve. The construction and shape of the valve stop or spacer is such that the shiftable valve element is kept centered in relation to the cross sectional area of the fluid flow and thereby enhances the smooth flow of fluid past the ball. As a result, valve chatter and other noise, and seat wear have been substantially eliminated.

Another aspect of the invention is to provide a valve spacer of the above type which is economical to manufacture from relatively inexpensive stock material and is easy to assemble and install.

These and other objects and advantages of the present invention will appear later as this disclosure progresses, reference being had to the accompanying drawings, in which:

FIGURE 1 is an axial, cross sectional view through a portion of a pump in which the invention is utilized;

FIGURE 2 is an enlarged sectional view of the piston shown in FIGURE 1;

FIGURE 3 is a perspective and exploded view of the valve spacer;

FIGURE 4 is an end view of the assembled spacer, and

FIGURE 5 is a perspective view of a modified form of the invention wherein the spacer is of one piece construction.

Referring in greater detail to the drawings, the pump shown for illustrative purposes only is of the type shown in my said copending application to which reference may be made if thought necessary or desirable. It is believed sufficient to say for purposes of this disclosure, however, that the pump housing 1 has a fluid inlet 2 through which a supply of fluid is introduced into the chamber 3 within the pump. An annular discharge chamber 4 connects all of the pumping units 5 in the housing with a common discharge port 6.

The pumping units are shown as being of the replaceable cartridge type and include the sleeve 7 which is secured in the bore 8 in the housing by tightening the threaded plug 9 against the outside of the housing 1 to thereby draw the sleeve 7 tightly against its locating and locking pin 10. The pumping units each also include an outlet check valve in the form of a spring biased ball 11 through which fluid is pumped by the piston 12 reciprocable in the sleeve bore 13.

The pistons are urged in the pumping direction (to the right in FIGURE 1) in the well-known manner by the driven swash plate 14 secured to drive shaft 15. These pistons are shifted in the suction direction by their springs 16 which act between the sleeve shoulder 17 and the washer 18 carried on each piston, to thereby hold the universally tiltable piston slippers 19 firmly against the working surface of the swash plate.

During the suction stroke of the piston, fluid is drawn from chamber 3 and into the drilled passage 20 that extends axially within the piston through the cross ports 21. This fluid rushes past the spring biased inlet check valve element 24, which has been shifted to the open position by the incoming fluid and the suction movement of the piston, through the counterbore 25, and into the pumping chamber formed by bore 13. The outlet check element 11 prevents fluid from returning to the pumping chamber from the discharge side of the pump.

When the piston begins its pumping stroke, the inlet check ball 24 must positively and immediately seal against the seat 26 which is formed at the juncture of passage 20 and counterbore 25 by the reamed counterbore 27 in passage 20. The spring 29 urges the ball 24 into the seating position, as does the fluid in the pumping chamber against which the piston is forced.

Immediately upon commencing the high speed suction stroke and for its duration, the maximum possible amount of fluid must be sucked through the piston to charge the pumping chamber. This flow should also be as free from turbulence as is possible, to thereby prevent heating of the fluid and inefficiency of the pump.

In order to attain smooth and maximum flow through the pumping units of these high-speed and large capacity pumps, it has been found necessary to accurately guide the shiftable valve element, whether of the ball, poppet or other types, during its movement in respect to the valve seat. The valve guide and stop S, now to be described, performs this function in addition to insuring luminar flow of the fluid.

The valve spacer S shown in FIGURE 3 is formed of flat stock steel and comprises two interengaging members 31 and 32 of generally U-shaped form. These members 31 and 32 have interengaging and complementary slots 33 and 34, respectively, which snugly slide over and embrace a corresponding part of the other member. Members 31 and 32 also each have axially extending legs 35 that are arranged in parallelism to define a central guideway therebetween and in which the valve element 24 is slidable. A small clearance is provided, between the outer surface of the ball and the inner surface of diametrically opposite legs, on the order of .005 of an inch, for example. The outer sides of legs 35 fit snugly in the bore 25 and the spacer is held captive therein by the snap ring 36.

To assemble the spacer S and insert it in the piston, it is only necessary to slip the members 31 and 32 together, place the spring 29 and ball 24 between legs 35, insert the spacer in the bore 25, and then insert the snap ring 36. The members 31 and 32 fit snugly together and require no welding or other fastening means therebetween.

The length of the assembled spacer corresponds to the distance between the shoulder 38 and the snap ring and axial movement of the spacer is thereby prevented. The end of the central projections 41 and 42 of the members 31 and 32, respectively, form a stop surface 44 for the element 24 during the suction stroke. The light return spring 29 is positioned between the legs 35 and the central projections 41 and 42.

The members 31 and 32 are arranged at right angles to one another and provide a considerable unrestricted cross sectional area through which the fluid may flow.

The modified spacer S1 shown in FIGURE 5 is generally similar to the FIGURE 3 spacer, and similar parts have been correspondingly numbered. However, members 31a and 32b are made from a single piece of steel and a one piece spacer thus provided.

During the suction stroke of the piston, the shiftable valve element 24 is maintained in a center position in respect to the cross sectional area of the fluid flow, and good flow clearance is thus provided all around the element. The element 24 is held in an axially aligned position in respect to the valve seat and cannot "walk around," or shift from side to side, and strike only one side or the other of the valve seat. Deformation and undue wear of the seat is thereby prevented, and a highly efficient flow of fluid through the piston is assured.

Various modes of carrying out the invention are contemplated as being within the scope of the following claim particularly pointing out and distinctly claiming the subject matter which is regarded as the invention.

I claim:

For a hydraulic pump, a valve unit comprising: a housing having an axial fluid passageway and also having a counterbore at one end thereof which defines a right angle shoulder between said passageway and said counterbore to form a valve seat at the juncture of said passageway and shoulder; a valve guide spacer assembly having an external diameter such that it fits snugly in said counterbore; said assembly comprising, a pair of relatively flat members arranged substantially at a right angle in respect to one another when viewed in cross section, said members having axially extending and circumferentially spaced legs arranged in parallelism to thereby define a central guide passageway therebetween, a central projection between the legs and forming a stop surface, a shiftable ball in said guide passageway, said legs abutting against said shoulder and located radially outwardly of said seat whereby said ball can be guided by said legs and bear directly against said seat when in the closed position and against said projection when in a fully open position; a spring in said guide passageway and mounted around said central projection for urging said ball against said seat, releasable snap ring means in said counterbore securing said assembly in said counterbore to prevent any axial shifting of said assembly, and an inlet cross port at the other end of said housing for admitting fluid to said axial passageway and through said assembly.

References Cited in the file of this patent

UNITED STATES PATENTS

| | | |
|---|---|---|
| 1,796,455 | Gunn | Mar. 17, 1931 |
| 1,901,217 | Yerkes | Mar. 14, 1933 |
| 2,622,615 | Golden | Dec. 23, 1952 |
| 2,707,965 | Allen | May 10, 1955 |
| 2,792,789 | Mizen | May 21, 1957 |
| 2,912,001 | Green | Nov. 10, 1959 |
| 2,941,475 | Blair | June 21, 1960 |
| 2,949,931 | Ruppright | Aug. 23, 1960 |